Oct. 29, 1935.    G. R. MEYERCORD ET AL    2,018,733
METHOD OF GLUING AND PRODUCT THEREOF
Filed July 24, 1933
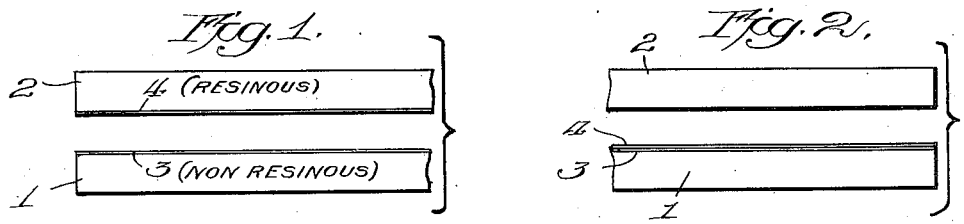
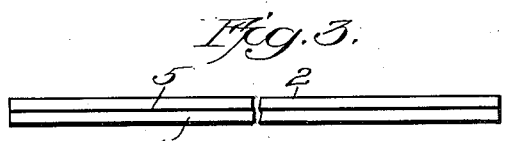
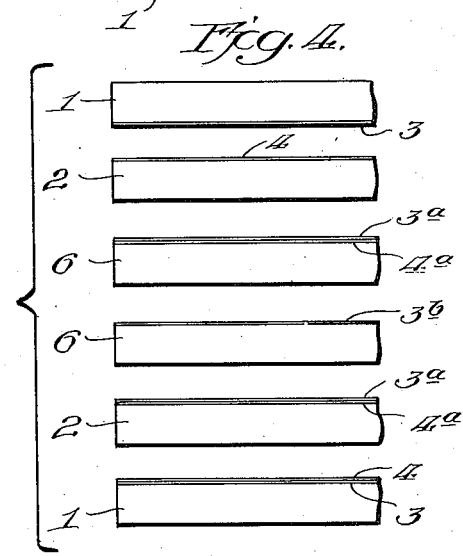
Inventors:
George R. Meyercord &
Charles E. Rozema,
by Wm. F. Freudenreich, Atty.

Patented Oct. 29, 1935

2,018,733

UNITED STATES PATENT OFFICE 2,018,733

METHOD OF GLUING AND PRODUCT THEREOF

George R. Meyercord, Chicago, Ill., and Charles E. Rozema, Grand Rapids, Mich., assignors, by mesne assignments, to Reconstruction Finance Corporation, a Federal corporation Application July 24, 1933, Serial No. 681,858

7 Claims. (Cl. 144—309)

Many different materials may be and are employed as the means for gluing the several layers or plies of ply-wood together; the material that is selected in any given case depending upon the intended use of the product. Dried blood and casein glues and, more recently, soya bean flour glues have been commonly used to produce reasonably satisfactory glue joints between wood veneers. Glue joints made from resinous materials in the reactive or fusible state, especially of the thermosetting phenol-aldehyde type, are, however, of much greater strength and offer much greater resistance to deterioration. The cost of these resinous materials is high relative to that of the ordinary glues, thus sharply limiting the field of use of resin glues. The relatively high cost of the resinous materials has led to the mixing of suitable resins with various proteinous adhesives, such as casein and soya bean flour, as well as with heat-coagulable albumins, in order to produce an adhesive possessing some of the desirable properties of the resin glue, while costing less than would an adhesive consisting wholly of resinous materials. Some of these mixtures must be used immediately after their preparation and none of them, so far as we know, are sufficiently stable to prevent settling out, particularly by the resinous components of the mixtures, during transportation or prolonged storage.

The object of the present invention is to make it possible successfully to produce glue joints containing both resinous and non-resinous adhesive materials, without encountering the difficulties incident to the manufacture of mixtures such as have heretofore been employed and the subsequent use of such mixtures.

We have discovered that the resinous and non-resinous components of the composite adhesive need not be mixed but may be applied separately to one or both of the faces of two wood veneers or plies to be joined together. In other words, the proteinous or/and albuminous component and the resinous component may each be prepared and applied as though it alone were being employed.

The albuminous or/and proteinous portion of the adhesive may be applied to the face of one sheet or ply of veneer and the resin, to the other sheet or ply; or, if desired, both applications may be made, one after the other, to the same sheet or ply. The resin may be applied as a resinous suspension, or as a resinous dispersion, or it may be applied in a dry state. Thus, for example, the non-resinous portion of the adhesive may be applied in a wet state and the resinous portion be sprinkled over the wet adhesive in a powdered state. In manufacturing a plywood panel containing more than three plies and, therefore, more than two joints, different combinations of glues may be employed in the various joints or, it may be that, in an inner joint or joints non-resinous glue will suffice.

The various features of novelty whereby our invention is characterized will hereinafter be pointed out with particularity in the claims; but, for a full understanding of the invention and of its objects and advantages, reference may be had to the following detailed description taken in connection with the accompanying drawing, wherein:

Figure 1 is an edge view showing, on a greatly enlarged scale, fragments of two wood veneers, each having thereon a glue layer on the face toward the other; Fig. 2 is a view similar to Fig. 1, showing both glue layers on one of the veneers; Fig. 3 is an edge view, on a smaller scale, showing the two veneers in each of Figs. 1 and 2 glued together; Fig. 4 is a view similar to Figs. 1 and 2, showing six plies or pieces of wood veneer provided with glue layers in accordance with the present invention, preparatory to being placed in the press; and Fig. 5 is an edge view, on a smaller scale, of a completed panel produced by gluing together the several veneers in Fig. 4.

Referring to Fig. 1 of the drawing, 1 and 2 are wood veneers adapted to be glued together. The veneer 1 is coated on one face, as indicated at 3, with coagulable proteinous or/and albuminous adhesive material, and one face of the veneer 2 is coated, as indicated at 4, with resinous materials in the reactive or fusible state, preferably of the thermosetting phenol-aldehyde type. Instead of placing one of the coatings on one veneer and the other coating on the other veneer, both of the adhesive coatings or layers may be applied to either of the veneers and none to the other. Thus, in Fig. 2 the layer or coating 4 is shown as applied to the veneer 1, directly upon the layer or coating 3. The gluing is then effected by bringing the veneers together and subjecting them to heat and pressure.

If the non-resinous adhesive material be dried blood, a glue joint comparable in strength and durability to an all-resin glue line may be obtained by substituting for about one-third of the resin a corresponding amount, by weight, of blood glue; the proportions being based on the dry weight of the blood and resin. When the non-resinous material is casein, for example, a larger proportion of resinous material is required to provide similar strength and durability.

The value of our invention does not depend solely on the saving effected in producing a single glue joint in an efficient and simple manner, for the greatest benefits result from the fact that the proportion of the resinous materials may be varied in the glue joints throughout a product containing more than three plies, so that each glue joint will be only as strong and durable as is necessary. In other words, it is the outer glue joints in a panel composed of more than three plies that are most subject to break down, either through physical or through chemical influences, and it is therefore these glue joints that must have a maximum strength and durability. For all practical purposes the resistance to physical or chemical deterioration offered by the inner glue joints need not equal that of an outer glue line, and therefore less, if any, resin is required in the inner glue joints. If the non-resinous adhesives that are used for the inner glue joints are not sufficiently resistant to the influences tending to cause deterioration therein, resinous materials, but in smaller amounts than for an outer glue joint, may be employed. Ordinarily the proportion of the non-resinous to the resinous materials may be increased up to fifty percent of the whole, depending upon the non-resinous material which is being used in any particular case. Generally speaking, it may be said that the strength and durability of the inner glue joints should exceed that of casein, soya bean flour, and other vegetable protein adhesive materials. However, if the non-resinous material be heat-coagulable albumins or/and proteins, such as are characteristic of dried blood, or what is commercially known as "Hemo", no resinous materials will ordinarily be required in the inner glue joints.

In Fig. 4 we have illustrated the various combinations of layers or coatings that may be employed. Thus, between each outer sheet or ply 1 and the adjacent inner sheet or ply 2 are placed the two glue coats or layers 3 and 4, as heretofore described. Between each of the plies 2 and the adjacent ply 6 are two glue layers or coats 4a and 3a and between the two plies 6, 6 is a single glue coat or layer 3b. The layers 4a are of resinous material which may differ in character and in quantity, or in both, from the resinous material in the layers or coatings 4. The layers 3a are of non-resinous materials which may be the same as or differ from the non-resinous materials in the layers or coatings 3. The layer or coating 3b consists entirely of heat-coagulable albumins or/and proteins such as are characteristic of dried blood.

When the panel, composed of the six plies or veneers shown in Fig. 4, with the glue layers or coatings thereon as we have described them, has been glued up under heat and pressure and is in the condition shown in Fig. 5, it contains or may contain three different types of glue joints; the two outer glue lines being comparable in strength and durability to an all-resin glue joint; the next two glue joints counting inwardly from opposite faces of the panel, possessing less inherent strength and durability, but sufficient for the purpose; and the innermost glue joint depending for its characteristics on materials other than resinous materials. In other words, while a considerable amount of resinous material is required in the two outer glue joints, there is a lesser amount in each of the next inner glue joints and none at all in the innermost glue joint. Consequently, the completed panel has glue joints properly proportioned as to strength and durability to cause the panel to be just as serviceable as though all of the glue joints were composed entirely of the relatively expensive resinous materials.

The heat and pressure applied to a rudimentary panel in the process of gluing it up result in a fusion of the resins with coagulable albumins or/and proteins; in the coagulation of the latter; in the penetration of the adhesive materials into the wood sufficiently to form a highly satisfactory bond; and in the liberation of gaseous reaction products from the resin which, in addition to causing coagulation, effect preservation of the albumins and proteins present. Thus, as heretofore stated, outer glue joints are produced which are as strong and resistant to deterioration as the all-resin glue joint which has heretofore been considered necessary for outer glue joints.

The preservation of destructible proteinous material in the non-resinous component of a glue joint is an important advantage. We prefer to use a phenol-formaldehyde resin in aqueous dispersion and containing a slight excess of formaldehyde. After the resin has been applied or spread it is preferably allowed to dry before the pressing operation. Not all of the formaldehyde is liberated during such drying and, therefore, during the pressing operation, the volatilized formaldehyde diffuses throughout the wood plies adjacent to the resinous layer. This, together with other gaseous reaction products, whether in natural or polymerized form, effects adequate coagulation and the preservation of the otherwise destructible components of the glue joint.

Another advantage that results from our invention is that our plywood panels can be glued up in less time than the panels having all-resin glue joints. The setting time of an all-resin glue joint is longer than that of a heat-coagulable glue joint. However, the setting time of our composite glue joint is only slightly longer than that required for the heat-coagulable glue joint.

Another advantage that we obtain is that lower gluing temperatures may be used than are necessary to produce all-resin glue joints. Whereas a temperature from 270° F. to 320° F. is needed for resinous materials, temperatures of from 240° F. to 260° F. are sufficient for the production of our new composite glue joints. This is true by reason of the fact that the temperature at which the non-resinous glues will set are much lower than those required for the resin; the temperatures required for the composite glues being in between. Therefore, there is a saving in the time required to bring the glue in the outer joints to the proper temperature; and, in the case of panels containing many plies, it becomes unnecessary to heat them long enough to bring the temperature at the innermost joints to that required at the outer joints, when there is no resin in the inermost joints, and a further saving in time results. Not only are we able to glue at lower temperatures, but we also are able to employ lower pressures during gluing. Pressures varying from two hundred pounds per square inch to four hundred pounds per square inch, depending upon the hardness of the wood, are required for gluing with resinous materials alone. Pressures of from one hundred pounds per square inch to one hundred fifty pounds per square inch are sufficient when practicing our new process. The ability to operate at lower pressures is important not only with respect to the saving in power but also in creating an improved product. When, for example, poplar or gum veneers are subjected to pressures in excess of two hundred pounds per square inch, the result is a non-uniform compression of the wood fibers. When the product is removed from the press, the unequally compressed portions tend to expand and assume their original shapes, thus producing an uneven surface on the panel. These woods we are able to glue under pressures sufficiently low to avoid such non-uniform compression.

It is obvious that the non-resinous portion of the glue joint should not only be heat-coagulable but also stable. When a blood glue has been employed a slightly alkaline (pH of 8 to 10.5) solution of dry blood plasticized with eight percent to ten percent of glycerin or ethylene glycol has been found most satisfactory. When fresh casein or soya bean flour is employed aqueous alkaline solutions or dispersions thereof may be used. While the resin is preferably in aqueous dispersion at the time it is applied, it may, of course, take any other desired form suitable for the purpose.

When a glue joint is to be formed from contracting layers of blood glue and resinous material, the blood solution may be applied to one of the veneers and be air-dried to permit the resin dispersion to be spread directly over the same. Regardless of whether the resin dispersion is applied over or under the blood glue or to the face of the other veneer, it is preferably air-dried so that when the two veneers are brought together the glue layers or coatings will be relatively dry. Sometimes there is an advantage in applying the resin component directly upon the non-resinous layer or coating as, for example, in the case of thin face veneers which it is always difficult to coat with fluid adhesive materials.

While we have described our invention in considerable detail and have presented a more or less diagrammatic drawing to illustrate the new process and product in only a simple way, we do not wish to be limited to the details thus described or illustrated; but intend to cover all methods and products coming within the definitions of our invention constituting the appended claims.

We claim:

1. The method of producing plywood containing at least three glue joints, which consists in assembling the plies with layers of adhesive material between them; there being a layer of thermosetting resinous material and a layer of non-resinous adhesive material between each ply and the next inner ply, the proportion of the resinous material to the non-resinous material decreasing from the outer faces of the assembly toward the center; and applying heat and pressure to the assembly.

2. The method of producing plywood containing at least three glue joints, which consists in assembling the plies with layers of adhesive between them; there being a layer of thermosetting resinous material and a layer of non-resinous adhesive material between each outer ply and the next inner ply, and there being between two inner plies only non-resinous heat-coagulable adhesive material; and applying heat and pressure.

3. The method of producing plywood containing at least three glue joints, which consists in assembling the plies with layers of adhesive materials in the joints between the same; there being a layer of thermosetting resinous material and a layer of non-resinous adhesive material between each outer ply and the next inner ply and in some of the other joints, and there being only non-resinous heat-coagulable adhesive material in an inner joint; the proportion of the resinous materials to the non-resinous adhesive materials decreasing from the outer joints inwardly; and applying heat and pressure.

4. Two members of wood joined by a glue joint comprising a layer of relatively non-plastic resinous material and a layer of non-resinous adhesive material interposed between the same.

5. A plywood member having glue joints all of which contain non-resinous adhesive materials and some of which, at least, contain resinous materials of a relatively non-plastic type, there being a larger proportion of resinous material in the outer than in inner glue joints.

6. A plywood member having glue joints all of which contain coagulated non-resinous adhesive materials and only the outermost of which contain resinous materials that are no longer fusible.

7. A glued multiple-ply panel containing more than three plies bonded by glues requiring heat for transformation into effective bonds, an inner bond being composed of material that responded to a lower temperature than that which was necessary to produce an outer bond.

GEORGE R. MEYERCORD.
CHARLES E. ROZEMA.